United States Patent [19]

Lee

[11] Patent Number: 4,813,393
[45] Date of Patent: Mar. 21, 1989

[54] ELECTRONIC IGNITION SYSTEM

[76] Inventor: Hong-Maw Lee, No. 95, Pa Te Lane, Yung Nan Ts'un, Yung Jing Hsiang, Changhua Hsien, Taiwan

[21] Appl. No.: 113,132

[22] Filed: Oct. 27, 1987

[51] Int. Cl.[4] .............................................. F02P 5/155
[52] U.S. Cl. ..................................... 123/415; 123/424
[58] Field of Search ................ 123/415, 418, 427, 424

[56] References Cited

U.S. PATENT DOCUMENTS

| | | | |
|---|---|---|---|
| 3,202,146 | 8/1965 | Short et al. | 123/415 |
| 3,910,243 | 10/1975 | Gau et al. | 123/415 |
| 3,923,029 | 12/1975 | Polo | 123/415 |
| 4,446,841 | 5/1984 | Van Siclen, Jr. | 123/602 |

Primary Examiner—Andrew M. Dolinar

[57] ABSTRACT

An electronic ignition system for igniting an engine at an optimum time with respect to a variation of a phase shift in response to the engine speed and the vacuum degree in the carburetor; this electronic system mainly incorporating two sets of R-C phase shift circuit and FET transistors and IC operation amplifier, pressure sensors and optical coupler to manipulate the timing signal of the engine induced by the coil of a magnetic distributor.

2 Claims, 2 Drawing Sheets

ELECTRONIC IGNITION SYSTEM

SUMMARY OF THE INVENTION

The present invention is concerned with an electronic ignition system adopted for increasing the efficiency of a engine by instructing the same to ignite at an optimum time in any situation. The present system can not only function in accordance with the engine speed but also respond according to the condition in the vacuum advance device so that it can better reduce the oil consumption and exhaust gas in practical operation of the engine.

The present electronic ignition system uses optical coupler, instead of light-sensitive resistor Cds, to increase its heat resistance, readiness of compensation, stability, and is also equipped with a delay circuit to protect ignition coil and to improve the engine starting characteristics.

The primary object of the present invention is to provide an improved electronic ignition system which mainly includes phase shift circuits comprising capacitors, FET, pressure sensor, and optical coupler. The pressure sensor is adopted to detect variation in vacuum degree of the carbutetor with the engine under loading and to output signal to effect brightening of optical coupler which can then change the negative voltage of Gate and Source in FET, resulting in a variation of RDS value. In response to a variation of an engine load, an optimum phase shift angle can be automatically obtained for a proper spark advance operation.

DETAILED DESCRIPTION

Figure 1:
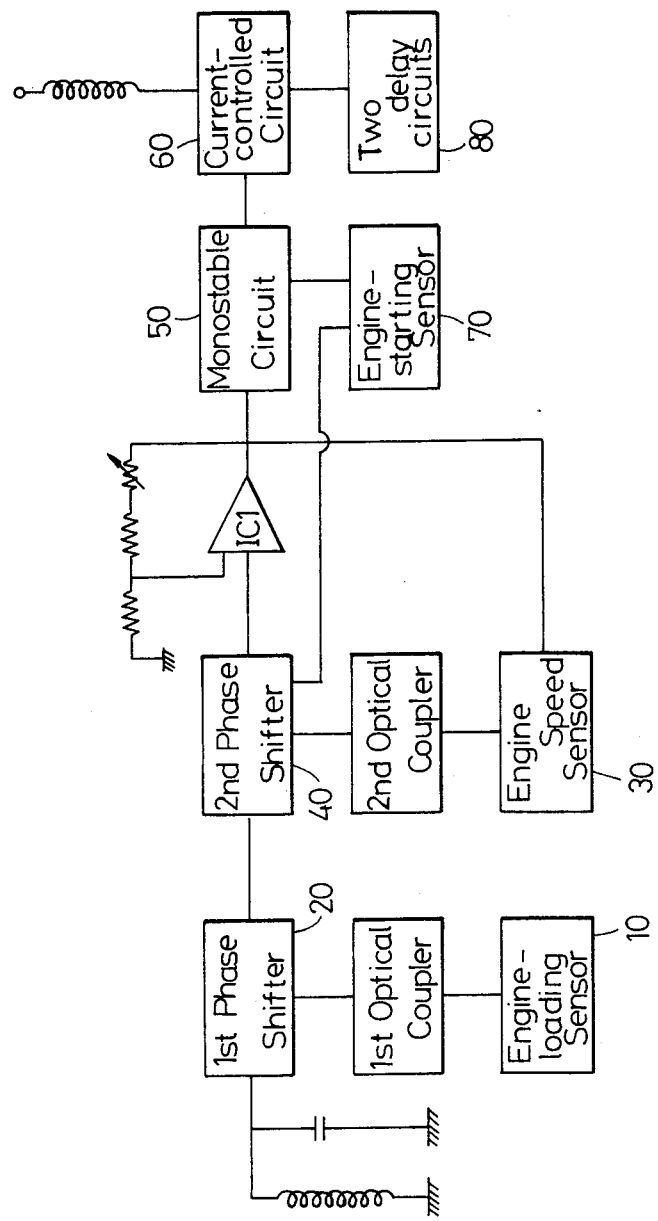
FIG. 1 is a block diagram of the present invention.
Figure 2:
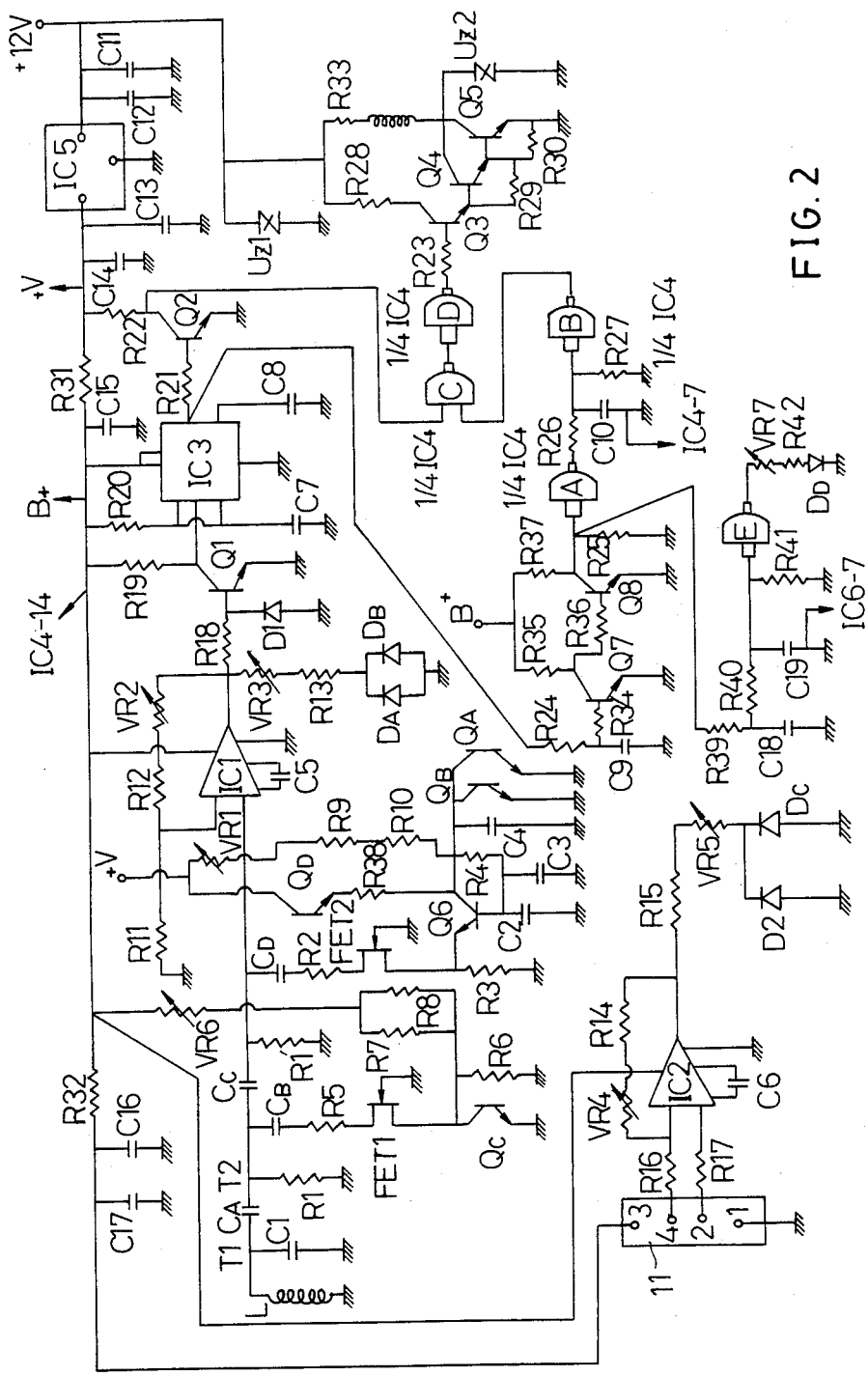
FIG. 2 shows a circuit diagram of the present invention.

Refer first to FIG. 1 and FIG. 2, major function blocks of the device are:

Block 10 engine-loading sensor, comprising pressure sensor 11, R16, R17, IC2, VR4, R14, R15, VR5, D2, and a first optical coupler Dc. Qc, VR6, R7, R8.

Block 20 first phase shifter controlled by block 10, comprising Ca R1, Cb, R5, R6, RDS of FET1.

Block 30 engine speed sensor, comprising IC1, VR3, R13, a second optical coupler Da, Qa, Db, Qb, VR1, R9, R10, C4, R4, C2, C3, Q6.

Block 40 second phase shifter controlled by block 40, comprising Cc, R'1, Cd, R2, RDS of FET2, R3.

Block 50 monostable circuit, comprising IC3, R20, C7, C8.

Block 60 current-control circuit, comprising Q2, R21, R22, R23, Q3, Q4, Q5, R29, NAND gate A, B, C, D.

Block 70 engine-starting sensor, comprising R24, C9, Q8, Q7.

Block 80: two delay circuits including a first delay circuit of R26, C10 and R27 and a second delay circuit R40, C19, and R41.

Block 10 working with block 20 enables the change in engine-loading to cause variation in phase shift circuit of block 20. Pressure sensor 11 outputs signal to change the brightness of Dc by sensing variation in the vacuum degree of a carburetor under engine-loading. The brightness of Dc controls Vce of Qc to change the negative voltage of G, S in FET 1 so as to control RDS resistance of FET 1 for variating the angle of phase shift in response to an engine load.

Block 30 working with block 40 has the capability to increase the phase shift of block 40 as a result of the increase of engine speed. Speed sensor outputs signal to change brightness of light-emitting diode Da, Db, by sensing the variation of an engine speed. The brightness of Da, Db controls Vce of Qa, Qb to change negative voltage of G, S in FET 2 to variate the RDS of FET 2 so as to increase a phase shift angle in response to an increasing engine speed.

Block 50 and Block 60 are used to control current in a primary winding of an ignition coil to prevent from sparking.

Block 70 and block 80 could prevent igniting-coil from damage by excessive heating when the engine is not started for a period over a period. If the R24, C9 sense no output signal from IC3, circuit R26, C10, R27, will cut off the current in the primary winding of an ignition coil. If there is an output signal from IC3 by using a delay circuit, it can delay advance angle at the moment of starting the engine so to improve the starting characteristics of the engine.

Other circuits included in the device are:

A voltage-stabilizing circuit for a power source consisting of IC5, C11, C12, C13, C14.

An inverse bypass circuit consisting of R31, C15, R32, C16, C17.

UZ1: preventing IC5 from damage by instant high voltage.

UZ2: preventing Q4, Q5, from damage by high voltage.

R33: current-limiting resistor of ignition coil.

D1: branching signal to prevent an overloaded inverse voltage between an emitter and a base of Q1.

R29, R30: raising voltage-loading of Vce in Q4, Q5.

C5, C6: phase compensation capacitor respectively for IC1, IC2.

D2: preventing Dc from overloading from inverse voltage.

OPERATION PRINCIPLE OF THE DEVICE

According to FIG. 2, description of operation principle of the device is as follows:

Effect Of Variation In Engine-loading (state change in block 10, 20)

(1) when the engine is at low speed; and the engine is at low loading:
pressure sensor outputs weak signal to IC2 because of low vacuum level (taking D411-61 engine as example, about 150 mmHg).
the signal after being amplified by IC2 enables Dc to light but with little brightness.
this results in small collect current Ic, and thus cause small drop in voltage of VR6, R7, R8, larger Vce in Qc.
larger Vce results in more negative voltage of G, S in FET1, and larger RDS value.
by formula (phase shift 1)$\theta = \text{arc } [\tan (XC/REf1)]$, very small phase shift occurs, wherein
Xc = capacitive reactance of Ca
$Ref1 = R1//(XCb + R5 + RDS \text{ of } FET1 + R6)$ The phase shift angle is reduced to be very small when the engine loading is small.

(2) When an acceleator pedal is depressed deeply, and the engine-loading is increased:
pressure sensor outputs stronger signal because of the increase in vacuum degree (pressure).

the signal after being amplified by IC2 increases the brightness of Dc, also larger Ic in Qc.

larger Ic causes larger voltage drop in parallel shunt circuit VR6, R7, R8.

therefore, Vce of Qc decreases; RDS value decrease. Since the decreased XC is so small, when an engine speed is increased, in comparison with a decrease of RDS value, the phase shift angle is still increased. thus the phase shift increases.

Since the phase shift is controlled by the engine-loading, the increase in engine-loading results in an increase in the phase shift.

Effect Of Variation in Engine Speed (state change in block 30, 40)

(1) when engine speed is low (about 600 r.p.m.):
coil L induces a signal of optimum engine spark advance to output a signal with low frequency, small amplitude.

the signal, amplified by IC1, passing VR3, R13, enable Da, Db to light, with little brightness.

little brightness in Da, Db produces larger Vce in Qa, Qb.

Vce of Qa, Qb provides more negative voltage on G, S in FET2. Thus, larger RDS value of FET2 is generated.

by formula (phase shift 2)$\theta$=arc [tan $(XCc/Ref2)$], phase shift is very small. Where $Ref2 = R'1//[XCd+R2+R3+RDS$ value of $FET2]$.

Phase shift is small, if engine speed is low.

(2) When engine speed is increased:
output signal induced by coil L increases in frequency and amplitude.

the signal, passing Ca, Cc, IC1, VR3, R13, causes increase in the brightness of Da, Db.

thus, Ic of Qa, Qb increases; voltage drop across VR1, R9, R10 increase.

Vce of Qa, Qb decrease, therefore G, S of FET2 decreases in negative voltage, creating smaller RDS value.

though there is also decrease of XCc, it is small compared with decrease in RDS.

Therefore the phase shift increases according to the increase in engine speed. But, it would be a max. phase shift as engine speed increases to some extent, (taking D411-61 as example, 2400 r.p.m.). Exceeding this speed, phase shift would not increase as limited by Da, Db. Qa, Qb, R9, R10.

If the electric current switch of car is turned on without starting the engine for several minutes, it often does damage to the ignition coil as heated by a continuous current. The device provides a current cut-off circuit which operates as follows:

Without starting the engine, there is no induced signal from L, thus no output signal in IC1. Being a monostable circuit of IC3, C7, C8, R20, there is no output in IC3 without an input from IC1. Thus Q2 is off. Input of gate C is "1". Without output from IC3, no voltage drops across R24, C9. Thus Q7 is off, Q8 on. Input of gate A is "0", output "1". R26, C10 forms a delay circuit.

Before C10 is charged, the output of gate B is "1", and output of C "0". Q4 and Q5 are conducted, there is a current in the primary winding of an ignition coil. But after C10 is charged, Q3, Q4, Q5 are off. And, thus cut off the current in the primary winding of the igniting coil.

If the engine is started by turning on an electric current switch, an output signal from IC1, passing R18 to conduct Q1 (Vce of Q is about 0), will trigger IC3 to produce a square wave. The square wave passes R21 and conducts Q12 to input "0" to gate C. Output of C is "1", D "0". Q3 is cut off, so do the Q4, and Q5. The current in the primary winding of ignition coil is out of existance suddenly. It induces high inverse emf, amplified by the secondary winding of ignition coil, and thus producing sparks. The spark ignites fuel mixture in the cylinder. At the same time, signal from IC3, passing R24, charges R9 to conduct Q7 and cut off Q8. Q8 is now off, the voltage in B+ can charge C18. R40, C19, R41 form a delay circuit. Before C19 is charged, the input of gate E is "0", and output "1". The output of gate E, passing VR7, R42, lights Dd, to saturate the optical transistor Qd. The voltage drop is small in Qd, R38. By a by-pass circuit of VR1, R9, R10, each Vce of Qa or Qb is increased, thereby increasing a negative voltage of G,S terminals of FET2. Phase shift 2 is very small. It can delay an advance angle to improve the "starting characters" (that means to reduce engine-heating time and to reduce exhaust gas). After several minutes (decided by R40, C19, R41 time constant), C19 will be charged. Output of E is "0". Dd and Qd are off. The phase shift circuit of block 40 is recovered to its normal advance status. Therefore, a spark advance can be effected by controlling a phase shift signal input to Q1, which is controlled by two phase shift circuits.

ADJUSTMENT OF DEVICE

Test and adjustment of phase shift in the system can be performed by instrument. Adjustment of the advance angle vs. Vacuum pressure can be done as follows. The engine is started and a signal as sensed from a magnetic distributor is transmitted to T1, and the signal at T2 is input to IC1, whereby the waveforms of T1 and T2 are compared and their phase differences are measured by oscillograph. Applying the accelerator padal to increase the pressure in the carburetor, one can adjust advance angle by changing VR4, VR5, VR6, based on the characteristics curve of advance angle vs. vacuum pressure according to their repair mannuals. One can choose various optical coupler, FET to conform to various engines, and change Ca, Cb, Cc, Cd, R2, R3, R5, R6, if needed.

CONCLUSION

Based on the preceeding description, the significant characteristics of the device are summarized as follows:

(1) An optimum starting angle for spark advance can be obtained by sensing an engine speed or a carburetor vacuum (engine load).

(2) An additional delay circuit, working with engine-starting sensor, could prevent igniting coil from damage by execess heat due to continuous current after turning on electric current switch for minutes without starting the engine.

(3) The use of optical coupler increases the stability of the phase shift and operation life.

(4) Without the help of other instrument, it could effect the best control of ignition in the engine of any car.

Accordingly, IC1 is provided to amplify and transmit the signals from the two phase shift circuits 20, 40 to operate the monostable circuit 50; IC2 provided for amplifying the signal from the pressure sensor 11; IC3 served as a major element of the monostable circuit 50;

IC4 comprised of plurality of NAND gates of the current control circuit 60; and IC5 provided as a major element of the voltage -stabilizing circuit of a power source.

What is claimed is:

1. An electronic ignition system comprising:
   a first integrated circuit (IC1) operatively transmitting and amplifying signals as sensed from an engine;
   an engine load sensing circuit including a pressure sensor operatively sensing a carburetor pressure for producing a pressure signal, a second integrated circuit (IC2) receiving and amplifying said pressure signal, and a first optical coupler having a first light emitting diode and a first photo transistor optically coupled with each other;
   a first phase shift circuit electronically connected to said engine load sensing circuit for operatively changing a phase shift angle of an engine spark advance, said first phase shift circuit being coupled to said first optical coupler;
   an engine speed sensing circuit operatively receiving an engine speed signal, amplified by said first integrated circuit (IC1), and a second optical coupler having a pair of second light emitting diodes respectively optically coupled with a pair of second photo transistors;
   a second phase shift circuit electronically connected to said engine speed sensing circuit for operatively changing another phase shift angle of a spark advance, said second phase shift circuit being coupled to said second optical coupler;
   a monostable circuit having a third integrated circuit (IC3) operatively producing a square wave as triggered by said first integrated circuit (IC1);
   a current control circuit having a fourth integrated circuit (IC4) comprises of a plurality of NAND gates operating said square wave from said monostable circuit for igniting an engine; an engine-start sensing circuit operatively detecting a square-wave signal from said third integrated circuit;
   two delay circuits having a first delay circuit electronically connected with said engine-start sensing circuit and operatively cutting off a sparking current of an ignition coil when sensing no signal from said third integrated circuit (IC3), and a second delay circuit sensing a square-wave signal from said IC3 for delaying a spark advance operation;
   and a voltage-stabilizing circuit for a power source having a fifth integrated circuit (IC5) electrically connected between a power source and all said integrated circuits for stabilizing a power voltage;
   the improvement which comprises:
   said first phase shift circuit including a first field-effect transistor (FET1) having its drain terminal connected to an input of said first integrated circuit and having its source terminal connected in series with said first photo transistor, and a first bypass circuit having a first set of resistors connected in series with said first photo transistor and connected in parallel with said FET1, whereby upon a variation of a carburetor pressure to change a voltage between a collector and an emitter of said first photo transistor, a resistance between the drain and source of said FET1 will be varied to advance a phase shift angle.

2. An electronic ignition system according to claim 1, the improvement further comprising: said second phase shift circuit including a second field-effect transistor (FET2) having its drain connected to an input of said IC1, and having its source connected in series with said second optical coupler, and a second bypass circuit with a second set of resistors connected in series to said second optical coupler, but connected in parallel to said FET2, whereby upon a variation of an engine speed to variate the voltage across said second photo transistor, a resistance between the drain and source of FET2 will be varied to further advance a phase shift angle.

* * * * *